(12) United States Patent
Kabasawa et al.

(10) Patent No.: US 9,048,668 B2
(45) Date of Patent: Jun. 2, 2015

(54) CHARGER

(75) Inventors: Takashi Kabasawa, Takasaki (JP); Hisanori Honma, Takasaki (JP)

(73) Assignee: FDK CORPORATION, Tokyo (JP)

( * ) Notice: Subject to any disclaimer, the term of this patent is extended or adjusted under 35 U.S.C. 154(b) by 355 days.

(21) Appl. No.: 13/467,559

(22) Filed: May 9, 2012

(65) Prior Publication Data

US 2012/0286722 A1    Nov. 15, 2012

(30) Foreign Application Priority Data

May 12, 2011    (JP) ................................ 2011-107137

(51) Int. Cl.
*H02J 7/00*    (2006.01)
(52) U.S. Cl.
CPC .................................. *H02J 7/0018* (2013.01)
(58) Field of Classification Search
CPC ......... H02J 7/00; H02J 7/0008; H02J 7/0009; H02J 7/0018; H02J 7/007; H02J 7/0019
USPC .................................................. 320/107, 162
See application file for complete search history.

(56) References Cited

U.S. PATENT DOCUMENTS

2009/0309547 A1\* 12/2009 Nakatsuji ...................... 320/134
2010/0201317 A1\* 8/2010 Shiu et al. ..................... 320/116

FOREIGN PATENT DOCUMENTS

JP        2008-259260 A    10/2008

OTHER PUBLICATIONS

Extended European Search Report for EP 12 16 7342, mailed Apr. 14, 2014.

\* cited by examiner

*Primary Examiner* — Vuthe Siek
*Assistant Examiner* — Aric Lin
(74) *Attorney, Agent, or Firm* — Marshall, Gerstein & Borun LLP

(57) ABSTRACT

The charger 10 includes a first charging path that charges battery banks via current limiting resistors R1 to R3, a second charging path that charges the battery banks without passing through the current limiting resistors R1 to R3, and a circuit that is capable of selectively switching the first and second charging paths to one another, being provided to the respective battery banks, and being identical in resistance values of the current limiting resistors R1 to R3. A battery voltage detection circuit detects the voltages of the battery banks; and a controller 16 controls the first to third charging circuits so that the battery banks are charged through the first charging path when there is difference in the voltages of the battery banks. The battery banks are charged through the second charging path when there is no difference in the voltages of the battery banks.

2 Claims, 3 Drawing Sheets

CHARGER

BACKGROUND OF THE INVENTION

1. Field of the Invention

The present invention relates to a charger that charges a plurality of batteries all at a time, or more specifically, a charger that charges, for example, a multi-parallel battery pack.

2. Description of the Related Art

A common charger that charges a multi-parallel battery pack consisting of a plurality of battery banks is one that finishes the charging at the time point when any one of the battery banks is fully charged, regardless of whether or not the other battery banks are fully charged. At the start of charging, battery banks usually have different state of charge. After any one of the battery banks is fully charged, if the charging is continued until all the other battery banks are fully charged, the first fully charged battery bank will be overcharged and might be deteriorated. For this reason, there is high possibility that a multi-parallel battery pack that is charged by a conventional charger mixedly contains the battery bank fully charged and those not fully charged, or that the state of charge of the battery banks becomes imbalanced. It is then likely that the primary overall battery capacity cannot be retained.

Among other conventional technologies of charging a multi-parallel battery pack consisting of a plurality of battery banks, a well-known technology is, for example, a charging method that repeatedly charges each battery bank in a multi-parallel battery pack consisting of a plurality of battery banks for a short period of time with an adequately low charging current (See Unexamined Japanese Patent Publication (Kokai) No. 2008-259260).

The imbalance of state of charge of the battery banks in the multi-parallel battery pack can be solved, for example, by detecting a state of full charge of each battery bank and finishing the charging of the battery banks one by one. On the other hand, in order to detect the state of full charge of each battery bank and finish charging the battery banks one by one, it is required to implement charge control on each battery bank. This might complicate the procedure of the control. If the state of full charge is detected with respect to each of the battery banks, and the charging is finished one by one, since the conditions of the battery banks are imbalanced during the charging, there is the possibility that the state of full charge of the battery banks cannot be accurately detected due to interaction of the heat generated in the battery banks.

The conventional technology disclosed in Unexamined Japanese Patent Publication No. 2008-259260 does not solve the imbalance of state of charge of the battery banks unless the state of charge of the battery banks are the same when the charging begins. According to the conventional technology disclosed in Unexamined Japanese Patent Publication No. 2008-259260, the battery banks are basically not fully charged, so that there still is the possibility that the primary battery capacity of the multi-parallel battery pack cannot be retained.

SUMMARY OF THE INVENTION

An aspect of the present invention is directed to a charger including a constant voltage and constant current DC power source; a plurality of charging circuits each including current limiting resistors, a first charging path that supplies the batteries with DC power that is outputted from the constant voltage and constant DC current power source via the current limiting resistors, a second charging path that supplies the batteries with DC power that is outputted from the constant voltage and constant current power source without passing through the current limiting resistors, and a charging path switching circuit that is capable of selectively switching between the first charging path and the second charging path, the charging circuits being provided to the respective batteries and being identical in resistance values of the current limiting resistors; a battery voltage detection circuit that detects the voltages of the batteries; and a controller that controls the charging circuits so that all the batteries are charged through the first charging path when there is difference in the voltages of the batteries, and that all the batteries are charged through the second charging path when there is no difference in the voltages of the batteries.

The current limiting resistors disposed in the charging paths are identical in resistance value. When there is difference in the voltages of the batteries, all the batteries are charged through the charging paths equipped with the current limiting resistors corresponding to the respective batteries (first charging path). In this process, the batteries having relatively high voltages (batteries having high state of charge) are relatively small in potential difference (potential difference between the voltage of DC power outputted from the constant voltage and constant current DC power source and the battery voltage) generated in the respective current limiting resistors. In result, the batteries having relatively high voltages are relatively low in charging current, and thus are charged at relatively low speed. In contrast, the batteries having relatively low voltages (batteries having low state of charge) are large in potential difference generated in the respective current limiting resistors, and thus relatively high in charging current, thereby being charged at relatively high speed.

Consequently, the potential difference between the batteries having relatively high voltages and those having relatively low voltages is gradually reduced as the batteries are charged, leading to a state where there is no difference in the voltages of all the batteries. In short, all the batteries become the same state of charge.

When there is no difference in the voltages of all the batteries, all the batteries are charged at constant current by using the charging path without a current limiting resistor (second charging path), which equalizes the charging currents of the batteries. All the batteries can therefore be fully charged at a time and reach a state of full charge in a minimum time. It is thus possible to fully charge all the battery banks in a minimum time without causing overcharge.

The charge control just uniformly switches the charging paths according to whether there is difference in the voltages of the batteries. This reduces costs because there is no need for a complicate charge control procedure, and the charging circuit has a very simple construction.

Accordingly, the invention provides the operation and advantages of materializing at low costs the charger capable of fully charging all battery banks without causing overcharge.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

An embodiment of the invention will be described below with reference to the attached drawings.

Configuration of Charger

The configuration of a charger 10 of the present invention will be described below with reference to FIG. 1.

Figure 1:
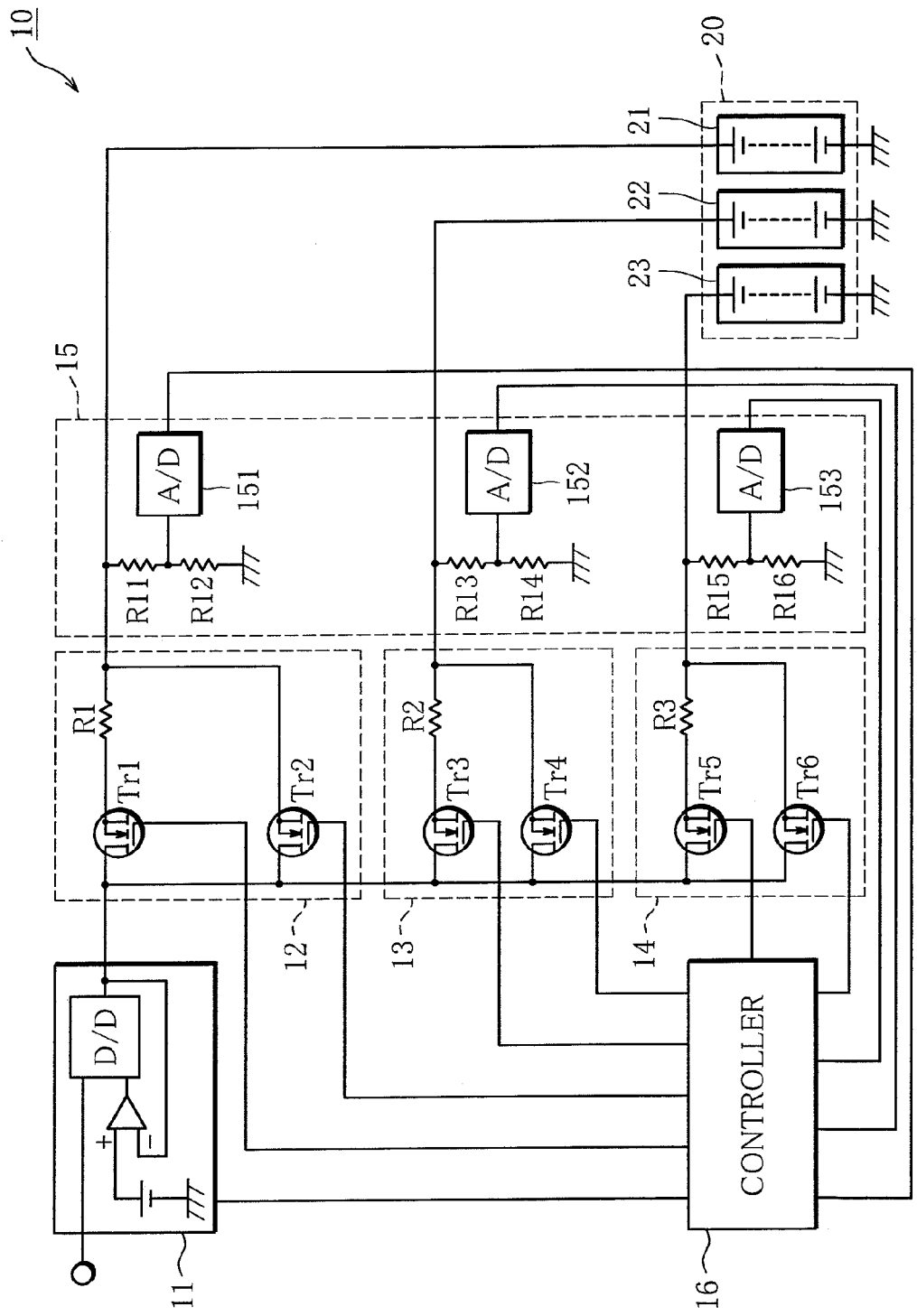
FIG. 1 is a view showing a whole configuration of a charger.

FIG. 1 is a view showing a whole configuration of the charger 10.

The charger 10 has a power source device 11, a first charging circuit 12, a second charging circuit 13, a third charging circuit 14, a battery voltage detection circuit 15 and a controller 16. A multi-parallel battery pack 20 charged by the charger 10 includes three battery banks 21 to 23. The battery banks 21 to 23 are rechargeable batteries such as nickel-hydrogen secondary batteries. The number of battery banks of the multi-parallel battery pack 20 to be charged according to the invention is not particularly limited to three as long as the battery pack 20 includes two or more battery banks.

The power source device 11 serving as a "constant voltage and constant current DC power source" is a well-known power source that receives DC power and outputs the DC power of constant voltage and constant current. The DC power outputted by the power source device 11 is supplied to the battery banks 21 to 23 of the multi-parallel battery pack 20 through the first charging circuit 12, the second charging circuit 13 and the third charging circuit 14.

The first charging circuit 12 serving as a "charging circuit" corresponds to the battery bank 21 of the multi-parallel battery pack 20. The first charging circuit 12 includes a current limiting resistor R1 and two field effect transistors (FET) Tr1 and Tr2 forming "charging path switching circuit". The field effect transistor Tr1 serving as a "first switch" and the field effect transistor Tr2 as a "second switch" have drain terminals connected to an output terminal of the power source device 11. A source terminal of the field effect transistor Tr1 is connected to one end of the current limiting resistor R1. A source terminal of the field effect transistor Tr2 is connected to the other end of the current limiting resistor R1. The field effect transistor Tr1 and the field effect transistor Tr2 have gate terminals connected to the controller 16 described later. A connection point of the source terminal of the field effect transistor Tr2 and the other end of the current limiting resistor R1 functions as an output terminal of the first charging circuit 12, and is connected to a positive terminal of the battery bank 21 of the multi-parallel battery pack 20.

The second charging circuit 13 serving as a "charging circuit" corresponds to the battery bank 22 of the multi-parallel battery pack 20. The second charging circuit 13 includes a current limiting resistor R2 and two field effect transistors Tr3 and Tr4 forming "charging path switching circuit". The field effect transistor Tr3 serving as a "first switch" and the field effect transistor Tr4 as a "second switch" have drain terminals connected to the output terminal of the power source device 11. A source terminal of the field effect transistor Tr3 is connected to one end of the current limiting resistor R2. A source terminal of the field effect transistor Tr4 is connected to the other end of the current limiting resistor R2. The field effect transistor Tr3 and the field effect transistor Tr4 have gate terminals connected to the controller 16 described later. A connection point of the source terminal of the field effect transistor Tr4 and the other end of the current limiting resistor R2 functions as an output terminal of the second charging circuit 13, and is connected to a positive terminal of the battery bank 22 of the multi-parallel battery pack 20.

The third charging circuit 14 serving as a "charging circuit" corresponds to the battery bank 23 of the multi-parallel battery pack 20. The third charging circuit 14 includes a current limiting resistor R3 and two field effect transistors Tr5 and Tr6 forming "charging path switching circuit". The field effect transistor Tr5 serving as a "first switch" and the field effect transistor Tr6 as a "second switch" have drain terminals connected to the output terminal of the power source device 11. A source terminal of the field effect transistor Tr5 is connected to one end of the current limiting resistor R3. A source terminal of the field effect transistor Tr6 is connected to the other end of the current limiting resistor R3. The field effect transistor Tr5 and the field effect transistor Tr6 have gate terminals connected to the controller 16 described later. A connection point of the source terminal of the field effect transistor Tr6 and the other end of the current limiting resistor R3 functions as an output terminal of the third charging circuit 14, and is connected to a positive terminal of the battery bank 23 of the multi-parallel battery pack 20.

Needless to say, the "first switch" and the "second switch" are not particularly limited to field effect transistors, and may be, for example, electromagnetic relays, solid state relays, bipolar transistors, insulated gate bipolar transistors (IGBT) or the like.

The DC power outputted by the power source device 11 in the first charging circuit 12 constructed as described above is supplied to the battery bank 21 via the current limiting resistor R1 when the field effect transistor Tr1 is in an ON state, and the field effect transistor Tr2 in an OFF state (first charging path). When the field effect transistor Tr1 is in the OFF state, and the field effect transistor Tr2 in the ON state, the DC power outputted by the power source device 11 in the first charging circuit 12 is supplied to the battery bank 21 without passing through the current limiting resistor R1 (second charging path). In other words, if the field effect transistors Tr1 and Tr2 are exclusively turned on/off, the first charging circuit 12 can be selectively switched between the charging path with the current limiting resistor R1 (first charging path) and the charging path without the current limiting resistor R1 (second charging path).

Likewise, if the field effect transistors Tr3 and Tr4 are exclusively turned on/off, the second charging circuit 13 can be selectively switched between the charging path with the current limiting resistor R2 (first charging path) and the charging path without the current limiting resistor R2 (second charging path). If the field effect transistors Tr5 and Tr6 are exclusively turned on/off, the third charging circuit 14 can be selectively switched between the charging path with the current limiting resistor R3 (first charging path) and the charging path without the current limiting resistor R3 (second charging path).

The current limiting resistor R1 of the first charging circuit 12, the current limiting resistor R2 of the second charging circuit 13, and the current limiting resistor R3 of the third charging circuit 14 are resistors of identical resistance values.

The battery voltage detection circuit 15 is a circuit that detects the voltage of each of the battery banks 21 to 23 of the multi-parallel battery pack 20, and includes six resistors R11 to R16 and three A/D converters 151 to 153. The A/D converters 151 to 153 are well-known analog-digital converters, which convert analog electric signals of voltages of the battery banks 21 to 23 into digital electric signals, and output the converted signals.

One end of the resistor R11 is connected to the positive terminal of the battery bank 21 of the multi-parallel battery pack 20. The other end of the resistor R11 is connected to one end of the resistor R12. The other end of the resistor R12 is connected to GND. A connection point of the resistors R11 and R12 is connected to an input terminal of the A/D converter 151. This means that the voltage of the battery bank 21 is divided by a voltage-dividing circuit formed of the resistors R11 and R12, and then inputted into the input terminal of the A/D converter 151. An output terminal of the A/D converter 151 is connected to the controller 16 described later.

One end of the resistor R13 is connected to the positive terminal of the battery bank 22 of the multi-parallel battery pack 20. The other end of the resistor R13 is connected to one end of the resistor R14. The other end of the resistor R14 is connected to GND. A connection point of the resistors R13 and R14 is connected to an input terminal of the A/D converter 152. That is to say, the voltage of the battery bank 22 is divided by a voltage-dividing circuit formed of the resistors R13 and R14, and then inputted into the input terminal of the A/D converter 152. An output terminal of the A/D converter 152 is connected to the controller 16 described later.

One end of the resistor R15 is connected to the positive terminal of the battery bank 23 of the multi-parallel battery pack 20. The other end of the resistor R15 is connected to one end of the resistor R16. The other end of the resistor R16 is connected to GND. A connection point of the resistors R15 and R16 is connected to an input terminal of the A/D converter 153. The voltage of the battery bank 23 is thus divided by a voltage-dividing circuit formed of the resistors R15 and R16, and then inputted into the input terminal of the A/D converter 153. An output terminal of the A/D converter 153 is connected to the controller 16 described later.

The controller 16 includes a well-known microcomputer control circuit. The controller 16 implements ON/OFF control of the field effect transistors Tr1 to Tr6 according to the voltages of the battery banks 21 to 23 of the multi-parallel battery pack 20, which are detected by the A/D converters 151 to 153.

Charge Control of Charger 10

The charge control implemented by the controller 16 in the charger 10 will be described below with reference to FIGS. 2 and 3.

Figure 2:
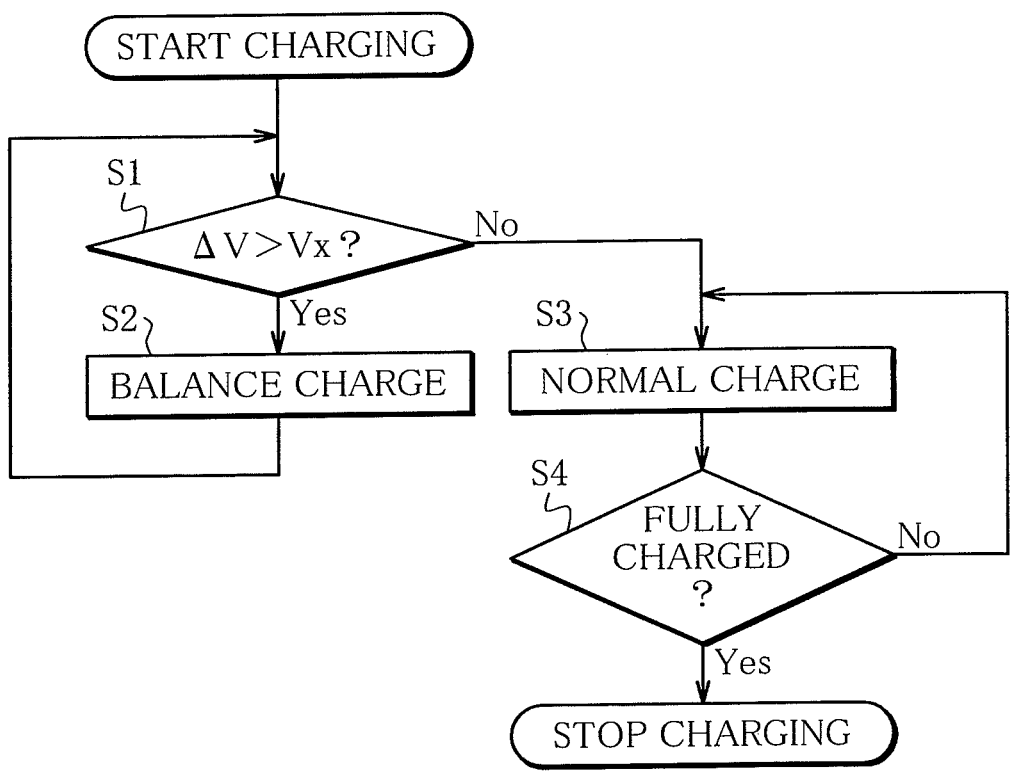
FIG. 2 is a flowchart showing charge control that is implemented by a controller.
Figure 3:
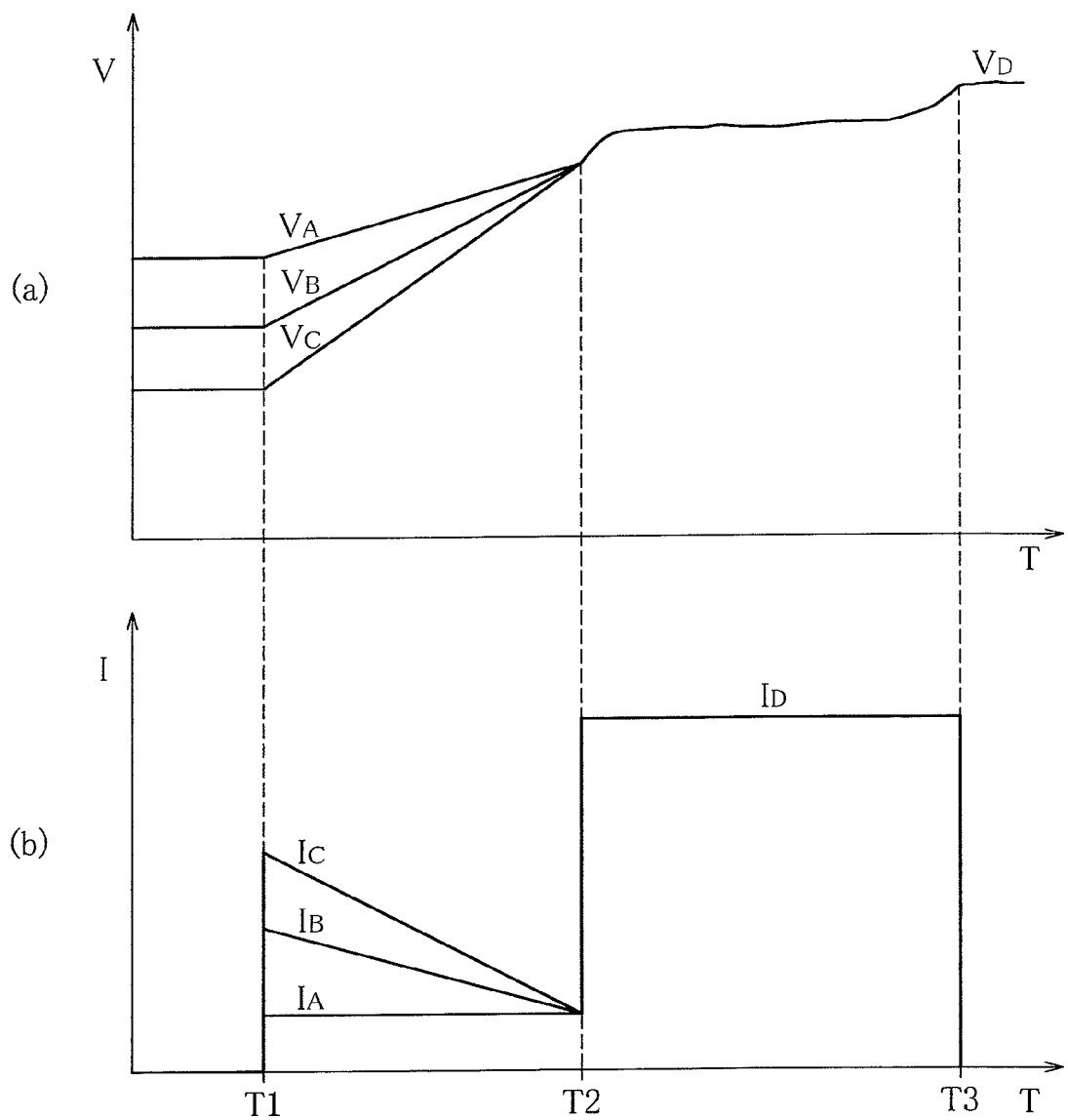
FIG. 3 includes timing charts showing changes in voltages of battery banks and in charging currents corresponding to the respective battery banks.

FIG. 2 is a flowchart showing the charge control implemented by the controller 16. FIG. 3 includes timing charts showing, in time series, changes in the voltages of the battery banks 21 to 23 and the charging currents corresponding to the respective battery banks 21 to 23 during the charge control implemented by the controller 16.

Once the charge control of the multi-parallel battery pack 20 begins, the controller 16 first makes a determination as to whether voltage difference $\Delta V$ of the three battery banks 21 to 23 is larger than a threshold voltage Vx (FIG. 2: Step S1). The voltage difference $\Delta V$ here means a deviation of the voltages of the battery banks 21 to 23. More specifically, the voltage difference $\Delta V$ is difference between the highest and lowest of the voltages of the battery banks 21 to 23. The threshold voltage Vx is preferably 0V. In this case, Step S1 determines whether the voltage difference $\Delta V$ is 0V, that is, whether there is the voltage difference $\Delta V$. For example, in consideration of an error in detection of the voltages of the battery banks 21 to 23, the threshold voltage Vx may be an arbitrary voltage within a range where a determination can be made as to whether there actually is the voltage difference $\Delta V$ or within a range where a deviation of the voltages of the battery banks 21 to 23 fully charged falls in an allowable range.

When the voltage difference $\Delta V$ of the battery banks 21 to 23 is larger than the threshold voltage Vx (FIG. 2: the result of Step S1 is YES), the controller 16 carries out balance charge (FIG. 2: Step S2). The balance charge means that all the battery banks 21 to 23 are charged while the field effect transistors Tr1, Tr3 and Tr5 are controlled to be on, and the field effect transistors Tr2, Tr4 and Tr6 to be off. In other words, the balance charge is to charge the battery banks through the charging path in which the DC power outputted by the power source device 11 is supplied to the battery banks 21 to 23 via the current limiting resistors R1 to R3 (first charging path).

Hereinafter, the voltages of the battery banks 21, 22 and 23 will be referred to as $V_A$, $V_B$ and $V_C$, respectively, and the charging currents of the battery banks 21, 22 and 23 will be referred to as $I_A$, $I_B$ and $I_C$, respectively.

In the balance charge, among the battery banks 21 to 23, those having relatively high voltage are relatively low in potential difference generated in the respective current limiting resistors, and are therefore relatively low in charging current, thereby being charged at relatively low speed. In contrast, the battery banks having relatively low voltages are relatively large in potential difference generated in the respective current limiting resistors, and are therefore relatively high in charging current, thereby being charged at relatively high speed. For example, let us assume that, at the start of the charging (FIG. 3: timing T1), the voltage $V_A$ of the battery bank 21 is a highest voltage value; the voltage $V_C$ of the battery bank 23 is a lowest voltage value; and the voltage $V_B$ of the battery bank 22 is a substantially middle voltage value between the voltages $V_A$ and $V_C$. In this case, the charging current $I_C$ of the battery bank 23 is a relatively highest current; the charging current $I_A$ of the battery bank 21 is a relatively lowest current; and the charging current $I_B$ of the battery bank 22 is a substantially middle current between the charging currents $I_C$ and $I_A$. In comparison, therefore, the battery bank 23 is charged at the highest speed, and the battery bank 21 at the lowest speed. The battery bank 22 is charged at a substantially middle speed therebetween. The voltage difference $\Delta V$ of the battery banks 21 to 23 is gradually decreased along with the charging of the battery banks 21 to 23.

When the voltage difference $\Delta V$ of the battery banks 21 to 23 becomes equal to or lower than the threshold voltage Vx (FIG. 2: the result of Step S1 is NO; FIG. 3: timing T2), that is, when the state of charge of the battery banks 21 to 23 become substantially equal, the controller 16 carries out normal charge (FIG. 2: Step S3). The normal charge means that all the battery banks 21 to 23 are charged while the field effect transistors Tr1, Tr3 and Tr5 are controlled to be off, and the field effect transistors Tr2, Tr4 and Tr6 to be on. In other words, the normal charge is to charge the battery banks through the charging path in which the DC power outputted by the power source device 11 is supplied to the battery banks 21 to 23 without passing through the current limiting resistors R1 to R3 (second charging path).

During the normal charge, the battery banks 21 to 23 are charged at constant current ID through the charging path without the current limiting resistors R1 to R3 (second charging path), so that the charging currents of the battery banks 21 to 23 are equal to each other. The battery banks 21 to 23 can be fully charged substantially at a time, and the voltages $V_A$ to $V_C$ of the battery banks 21 to 23 reach the full charge voltage $V_D$ in a minimum time (FIG. 3: timing T3). It is thus possible to fully charge all the battery banks 21 to 23 in a minimum time without causing overcharge. More specifically, the controller 16 makes a determination as to whether any one of the voltages $V_A$ to $V_C$ of the battery banks 21 to 23 has reached the full charge voltage $V_D$ (FIG. 2: Step S4). If none of the voltages $V_A$ to $V_C$ of the battery banks 21 to 23 has reached the full charge voltage $V_D$ (FIG. 2: the result of Step S4 is NO), the normal charge is continued. At the time point when any one of the voltages $V_A$ to $V_C$ of the battery banks 21 to 23 reaches the full charge voltage $V_D$ (FIG. 2: the result of Step S4 is YES), all the field effect transistors Tr1 to Tr6 are controlled to be off, and thus, the charging of the battery banks 21 to 23 is stopped.

As described above, the charger 10 according to the invention is capable of fully charging all the battery banks 21 to 23 of the multi-parallel battery pack 20 without causing overcharge. The charge control just uniformly switches the charging paths to one another according to whether there is the voltage difference ΔV of the battery banks 21 to 23. For this reason, there is no need for a complicate charge control procedure, so that the first, second and third charging circuits 12, 13 and 14 have very simple constructions, and can be materialized at low costs.

The invention thus provides at low costs the charger 10 that is capable of fully charging all the battery banks 21 to 23 without causing overcharge.

What is claimed is:

1. A charger comprising:
   a constant voltage and constant current DC power source;
   a plurality of charging circuits including current limiting resistors, a first charging path that supplies the batteries with DC power that is outputted from the constant voltage and constant DC current power source via the current limiting resistors, a second charging path that supplies the batteries with DC power that is outputted from the constant voltage and constant current power source without passing through the current limiting resistors, and a charging path switching circuit that is capable of selectively switching between the first charging path and the second charging path, the charging circuits being provided to the respective batteries and being identical in resistance values of the current limiting resistors;
   a battery voltage detection circuit that detects voltages of a plurality of batteries; and
   a controller that controls the charging circuits so that all the batteries are charged through the first charging path when there is a difference in the voltages of the batteries, and that all the batteries are charged through the second charging path when there is no difference in the voltages of the batteries.

2. The charger according to claim 1, wherein:
   the charging path switching circuit includes a first switch for turning on/off the first charging path and a second switch for turning on/off the second charging path.

* * * * *